(12) United States Patent
Crampe et al.

(10) Patent No.: US 9,114,361 B2
(45) Date of Patent: Aug. 25, 2015

(54) DEVICE FOR TREATING AN UPSTREAM FLOW WITH A SOLID PRODUCT AND ASSOCIATED TREATMENT METHOD

(71) Applicant: RHODIA OPERATIONS, Aubervilliers (FR)

(72) Inventors: Christian Crampe, Couzon-au-mont-d'or (FR); Olivier Bourgeois, Labergement DeCuisery (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/358,456

(22) PCT Filed: Nov. 15, 2012

(86) PCT No.: PCT/EP2012/072740
§ 371 (c)(1),
(2) Date: May 15, 2014

(87) PCT Pub. No.: WO2013/072420
PCT Pub. Date: May 23, 2013

(65) Prior Publication Data
US 2014/0335000 A1 Nov. 13, 2014

(30) Foreign Application Priority Data

Nov. 18, 2011 (FR) .................................... 11 60528

(51) Int. Cl.
| | | |
|---|---|---|
| *B01D 53/34* | (2006.01) | |
| *B01D 53/86* | (2006.01) | |
| *B01D 53/88* | (2006.01) | |
| *B01J 19/24* | (2006.01) | |
| *B01J 8/02* | (2006.01) | |

(52) U.S. Cl.
CPC ............ *B01D 53/8631* (2013.01); *B01D 53/88* (2013.01); *B01J 8/02* (2013.01); *B01J 19/249* (2013.01); *B01J 2208/00814* (2013.01); *B01J 2219/2454* (2013.01); *B01J 2219/2458* (2013.01); *B01J 2219/2472* (2013.01); *B01J 2219/2481* (2013.01); *B01J 2219/2486* (2013.01); *B01J 2219/2495* (2013.01)

(58) Field of Classification Search
CPC ...... B01D 53/34; B01D 53/565; B01D 53/86; B01D 53/8631; B01D 53/885; B01D 53/88
See application file for complete search history.

(56) References Cited

U.S. PATENT DOCUMENTS

2014/0305309 A1* 10/2014 McKenna et al. ................ 96/147

FOREIGN PATENT DOCUMENTS

| CA | 2049022 C | * | 8/2000 | ............. B01D 53/04 |
| KR | 101057342 B1 | * | 8/2011 | ......... B01D 53/8625 |
| WO | WO 96/20039 A1 | * | 7/1996 | ......... B01D 53/8668 |
| WO | WO 2010/046675 A1 | * | 4/2010 | ......... B01D 53/8631 |

\* cited by examiner

*Primary Examiner* — Timothy Vanoy

(57) ABSTRACT

The device comprises a support (20) and at least one basket (22A to 22E) carried by said support (20). The basket (22A to 22E) comprises an upstream apertured wall (60) and a downstream apertured wall (62) together defining an intermediate space (70) for receiving the solid product (24). The upstream apertured wall (60) defines, opposite the intermediate space (70), a feed passage (90) for the upstream flow, and the downstream apertured wall (62) defines, opposite the intermediate space (70), a discharge passage (92) for a treated flow. The upstream apertured wall (60) and the downstream apertured wall (62) are mounted in such a way that said apertured walls can be moved freely in relation to one another and in relation to the support (20), on a given expansion path.

20 Claims, 4 Drawing Sheets

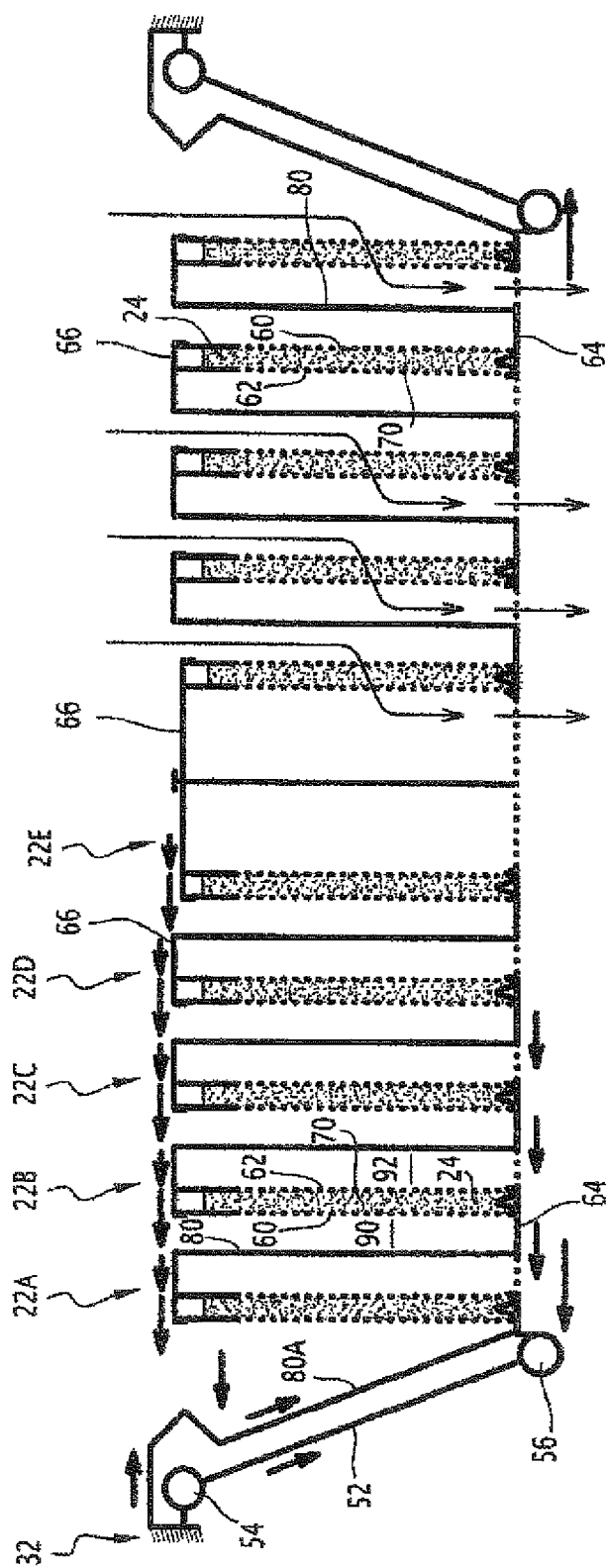

DEVICE FOR TREATING AN UPSTREAM FLOW WITH A SOLID PRODUCT AND ASSOCIATED TREATMENT METHOD

This application is a U.S. national stage entry under 35 U.S.C. §371 of International Application No. PCT/EP2012/072740, filed Nov. 15, 2012, which claims priority to French Application No. 1160528 filed on Nov. 18, 2011. The entire content of each of these applications is hereby incorporated herein.

The present invention relates to a device for treating an upstream flow over a solid product, comprising:
- a support,
- at least one basket supported by the support, the basket comprising an upstream perforated wall and a downstream perforated wall which between them delimit an intermediate space for housing the solid product, the upstream perforated wall delimiting, on the opposite side to the intermediate space, an upstream flow conveying passage, the downstream perforated wall delimiting, on the opposite side to the intermediate space, a passage for discharging a treated flow.

Such a device is intended to be placed, for example, in a chemical production plant. The treatment device is intended to be inserted in a reaction chamber of the plant, the support that supports the device being fixed in the chamber.

The upstream flow is, in particular, a flow of gas. The upstream flow advantageously has a high temperature, for example in excess of 750° C., and a pressure close to, or even slightly lower than, atmospheric pressure or above.

The upstream flow advantageously contains a gas that is to be treated, such as an oxide of nitrogen. The upstream flow is notably the result of the conversion of ammonia to form nitric acid or hydrogen cyanide.

The solid treatment product is, in particular, a solid catalyst which takes the form of a divided material comprising pieces, granules or a powder.

In order to produce nitric acid or hydrogen cyanide from ammonia, it is necessary to oxidize the ammonia on a catalyst at high temperature and at low-to-high pressure, for example using an Ostwald or Andrussow reaction.

The gaseous flow obtained contains oxides of nitrogen which are partially recirculated. However, some of the oxides of nitrogen produced need to be abated to prevent them from being discharged into the atmosphere.

This is because present-day restrictions on the emissions of oxides of nitrogen limit the discharge of these gases into the atmosphere or, in some cases, allow a partial discharge conditional on the payment of taxes which increase the overall cost of the process.

In order to abate the oxides of nitrogen, it is known practice to place a special catalyst in the reactor. This catalyst is positioned in series with the catalyst intended to oxidize the ammonia. The catalyst for the abatement of the oxides of nitrogen is, for example, formed of metal oxides in the form of particles.

Such a catalyst has the disadvantage of increasing the pressure drop suffered by the gases produced by the process. This notably increases the compression required, and the costs associated with this compression.

To alleviate this problem, it may be desirable to reduce the pressure drop by reducing the quantity of catalyst. If this is done, the treatment of the upstream gaseous flow is insufficient.

To address these problems, WO 2010/046675 describes a device of the aforementioned type which comprises a circumferential basket supported by a support fixed in the reactor.

The basket defines a central orifice, via which the upstream flow under pressure is conveyed, and an exterior annular space via which the treated downstream flow is extracted.

The basket is fixed rigidly between a convergent upper ring which closes off the basket at the top, and a downstream disk which closes off the basket at the bottom.

Such a device is not entirely satisfactory because as the temperature of the device increases, notably on plant startup, the temperature differences between the upstream flow and the downstream flow are considerable, notably greater than 100° C. These temperature differences may reach more than 500° C. in some cases.

Because the device is mounted rigidly, the perforated walls delimiting the baskets suffer extensive deformation.

Because on top of this the flow circulates radially from the inside of the basket outward, the downstream wall deforms less than the upstream wall, giving rise to stresses and causing compaction of the catalyst.

In some cases, the deformations are such that they even cause the gratings that delimit the perforated walls to rupture. The catalyst can then escape, in part, from the basket, reducing the level of catalyst. This causes some of the upstream flow to pass to downstream of the device without coming into contact with the catalyst. The abatement of oxides of nitrogen is therefore greatly lessened.

It is an object of the invention therefore to obtain a device containing a solid treatment product, through which an upstream flow that is to be treated passes, the device being capable effectively of withstanding high temperature differences, notably during process startup, or when the process has not yet reached steady state conditions.

To this end, one subject of the invention is a device of the aforementioned type, characterized in that the upstream perforated wall and the downstream perforated wall are mounted freely movable relative to one another and relative to the support, over a given expansion travel.

The device according to the invention may comprise one or more of the following features, considered in isolation or in any technically possible combinations:
- the upstream perforated wall and the downstream perforated wall are of revolution about a central axis (A-A'), the upstream perforated wall and the downstream perforated wall being mounted free to move radially relative to the central axis (A-A') over the given expansion travel,
- the passage for conveying the upstream flow is situated radially on the outside relative to the passage for discharging the treated flow with respect to the central axis (A-A'),
- each basket comprises a base structure, the upstream perforated wall and the downstream perforated wall being placed on the base structure, the upstream perforated wall and the downstream perforated wall being slidably mounted on the base structure, the base structure advantageously being slidably mounted on the support,
- the base structure comprises a deflector intended to be positioned facing the upstream perforated wall to delimit the conveying passage and/or facing a downstream perforated wall to delimit the discharge passage,
- at least one base structure delimits an exterior deflector, the exterior deflector being connected to the support via an expansion absorbing member, advantageously an expansion bellows,
- it comprises a baffle intended to be inserted in a lower part of the intermediate space to be covered with solid product, the basket comprises a cover positioned over the upstream perforated wall and the downstream perforated wall, a seal being inserted between the cover and the upstream perforated wall, the upstream perforated wall comprises a solid upper region, and a perforated lower region, the solid upper region and the perforated lower region being intended to be positioned facing the conveying passage, it comprises a plurality of baskets, each basket comprising an upstream perforated wall and a downstream perforated wall which are mounted with the freedom to move over a given expansion travel, the baskets being positioned one inside the other, the support has a plurality of openings through which flow can pass, of the conveying passage and the discharge passage at least one opening facing the passage openings, the support comprises an exterior fixed part and a base supporting the or each basket, the base being free to move over an expansion travel relative to the exterior fixed part, advantageously by being articulated via a number of tie bolts, the support defines a sliding surface for the or each basket.

Another subject of the invention is a method comprising the following steps:

providing a device as defined above, the or each basket comprising a solid treatment product in its intermediate space, conveying an upstream flow in the conveying passage, passing the upstream flow through the upstream perforated wall and bringing the upstream flow into contact with the solid product to generate a treated downstream flow, removing the downstream flow through the downstream perforated wall and through the discharge passage, characterized in that the upstream perforated wall and the downstream perforated wall move freely relative to one another and relative to the support over a given expansion travel when the preceding steps are being carried out.

The method according to the invention may comprise one or more of the following features, considered in isolation or in any technically possible combinations:

the temperature difference between the upstream flow and the downstream flow is greater than 100° C., advantageously greater than 250° C., the upstream flow is a gaseous flow, notably a flow containing an oxide of nitrogen, the solid treatment product being a catalyst, notably an oxidation catalyst or a catalyst for the abatement of a gas that is to be eliminated.

The invention will be better understood from reading the description which will follow, given solely by way of example and made with reference to the attached drawings in which:

FIG. 4 is an outline drawing illustrating how the device behaves in use.

In everything that follows, the terms "upstream" and "downstream" generally refer to the normal direction in which a fluid circulates through the device.

Figure 1:
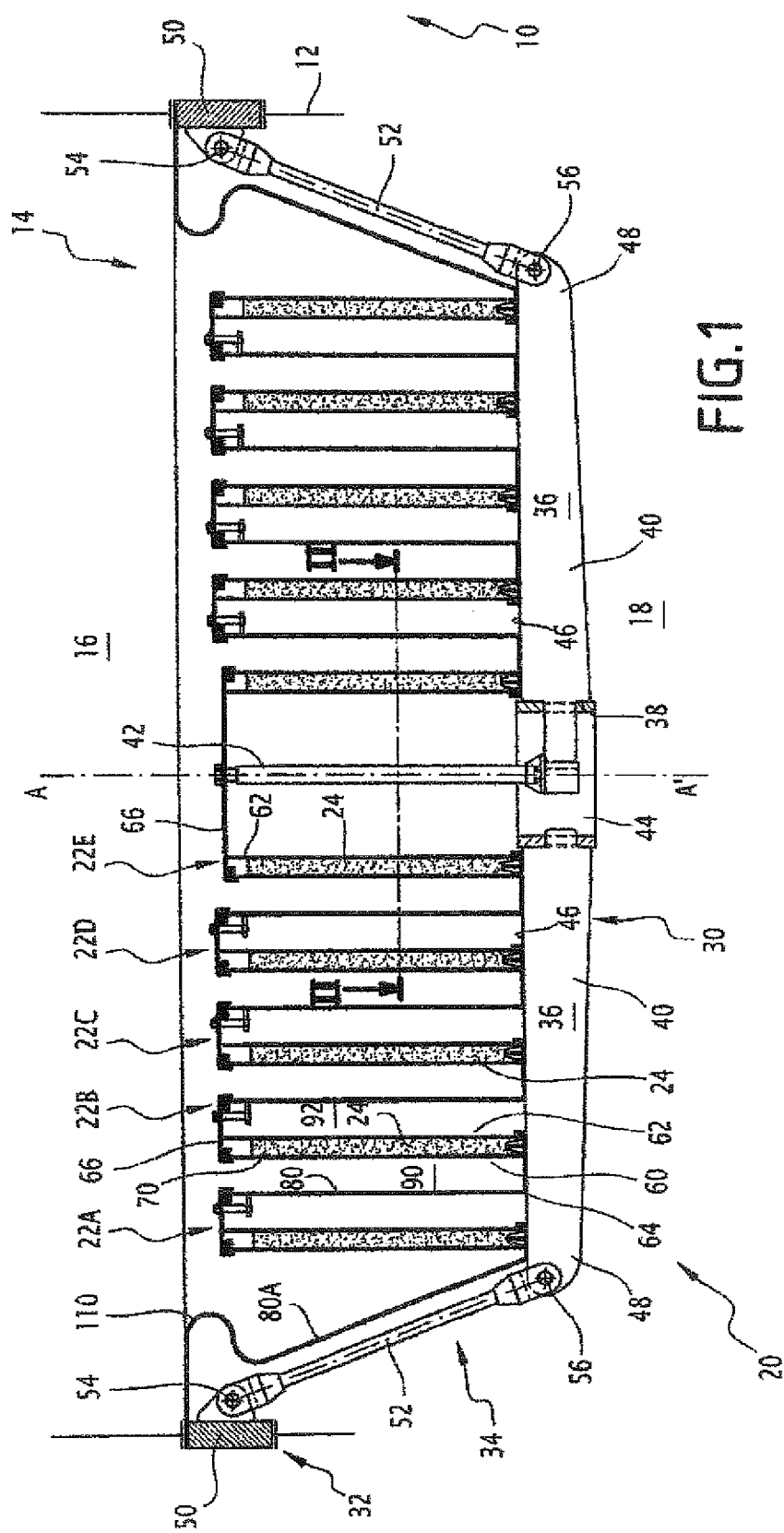
FIG. 1 is a view, in section on a vertical median plane, of a plant comprising a first treatment device according to the invention.

A first chemical production plant 10 is illustrated partially in FIG. 1. This plant 10 comprises a chamber 12 in which an upstream flow is generated, and a device 14 for treating the upstream flow to form a treated downstream flow after it has passed through the device 14.

In the example depicted in FIG. 1, the upstream flow is a gaseous flow. It is advantageously generated in an upstream part 16 of the chamber 12. The upstream part 16 is situated above the device 14 in FIG. 1.

The upstream flow passes through the device 14 to reach a downstream part 18 of the chamber 12 after it has been treated in the device 14. The downstream part 18 is situated underneath the device 14 in FIG. 1.

The upstream flow is generally at a low-to-high temperature and pressure.

The pressure of the gas in the upstream flow is, for example, below 1 bar absolute, notably below 0.95 bar absolute. It may also be higher than 2 bar, notably higher than 4 bar.

The temperature of the upstream flow is for example greater than 750° C., notably greater than 1000° C.

In one particular embodiment, the plant 10 is a plant producing nitric acid or hydrogen cyanide from ammonia.

In that case, the upstream flow is a flow of ammonia, or a flow produced from ammonia, notably from an oxidation of the ammonia. The upstream flow contains, for example, ammonia that has not been oxidized, nitric acid and at least one gas that is to be treated in the device 14, notably an oxide of nitrogen.

The chamber 12 is, for example, a chemical reactor consisting of a vessel. As an alternative, the chamber 12 is a pipe in which a flow circulates continuously.

The volume of the chamber 12 is advantageously greater than 10 m$^3$. It is notably comprised between 1 m$^3$ and 50 m$^3$.

The device 14 is interposed across the chamber 12. It is thus fixed in the chamber 12 so that all of the upstream flow passes through the device 14 where it is treated.

As illustrated by FIG. 1, the treatment device 14 comprises a support 20 and a set of baskets 22A to 22E placed one inside the other. Each basket 22A to 22E contains a solid product 24 for the treatment of the upstream flow.

The solid product 24 is advantageously in the form of a divided solid substance, for example in the form of powder, granules or pieces of solid. It generally takes the form of flakes, spheres, rings, cylinders or extrudates which are porous. The maximum dimension of each individual solid of the solid product 24 is for example comprised between 1 mm and 20 mm, particularly between 3 mm and 10 mm.

The solid product 24 advantageously constitutes a catalyst that catalyzes the reaction that treats the upstream flow. The solid product is, for example, an oxidation catalyst, a catalyst for the abatement of a gas that is to be treated or a mixture of these products.

In the case where the solid product 24 is an ammonia oxidation catalyst, it may be chosen from a noble metal of the platinum group, supported or otherwise, which may comprise a base metal or a base metal oxide, the base metal being a transition metal or a rare earth.

As an alternative, the oxidation catalyst is a mixture of several base metals with several precious metals.

Examples of oxidation catalysts are given on page 3 of WO 2010/046675 and will not be repeated in greater detail here.

In instances in which the solid product 24 is a catalyst for the abatement of oxides of nitrogen, it may be chosen from a supported metal, a pure or mixed metal oxide, or a zeolite system, for example chosen from the products described on pages 30 to 32 of the article Applied Catalysis B: Environmental, 9 (1996), pages 25 to 64, in the references appended to that article, or on pages 4 to 6 of WO 2010/046675. These catalysts will not be described in further detail here.

As illustrated in FIG. 1, the support 20 comprises a perforated base 30 supporting the baskets 22A to 22E, and an exterior part 32 for attachment to the chamber 12.

In this example, the support 20 further comprises an assembly 34 for articulating the base 30 relative to the exterior attachment part 32 in order to absorb transverse expansions of the base 30.

The base 30 extends, in this example, around a central axis A-A' depicted as vertical in FIG. 1. It defines a plurality of openings 36 for the passage of the treated flow, extending facing and underneath the baskets 22A to 22E.

The base 30 here comprises a central structure 38 and a plurality of disjointed beams 40 extending radially from the central structure 38 away from the axis A-A'.

The base 30 further comprises a central rod 42 for the attachment of at least one basket 22.

The central structure 38 is advantageously in the form of a ring. It delimits an axial through-opening 44.

The beams 40 are fixed externally to the central structure 38. Between them they delimit the openings 36 for the passage of the treated flow. They extend as far as a free end 48 situated some distance from the walls of the chamber 12.

The height of the beams is advantageously greater than the width thereof.

The base 30 defines an upper surface 46 for the sliding of the baskets 22A to 22E, which surface is advantageously situated on the beams 40.

The rod 42 is connected to the collar 38. It projects upward through the axial through-opening 44 above the sliding surface 46.

The exterior part 32 is, for example, formed by a ring 50 fixed to the wall of the chamber. The ring 50 has a diameter greater than the diameter defined by the base 30.

The exterior part 32 is situated above the sliding surface 46 of the baskets. The exterior part 32 is kept fixedly on a wall of the chamber 12.

In the example depicted in FIG. 1, the articulation assembly 34 comprises a plurality of tie bolts 52 connecting the exterior part 32 to the base 30. Each tie bolt 52 is thus articulated at an upper point 54 to the exterior part 32, and at a lower point 56 near a free end 48 of a beam.

Each tie bolt 52 projects downward, advantageously at an angle to the axis A-A' from the exterior part 32.

The base 30 is suspended downward from the exterior part 32.

Thus, as each beam 40 expands, causing the base 30 to expand radially, the tie bolts 52 pivot about the articulation points 54, 56 to absorb the deformations of the base 30, keeping the sliding surface 46 horizontal.

In the example depicted in FIG. 1, the device 14 comprises a plurality of baskets 22A to 22E, each basket 22A to 22E being of revolution about the axis A-A'. The number of baskets 22A to 22E is generally comprised between 1 and 10.

In this example, the baskets 22A to 22E are positioned concentrically relative to one another. Thus, the maximum transverse extent of each basket 22A to 22E decreases when working from the outermost basket 22A to the innermost basket 22E.

As illustrated in the figure, each basket 22A to 22E comprises an upstream perforated wall 60 and a downstream perforated wall 62. Each basket 22A to 22E further comprises a base structure 64 intended to slide on the sliding surface 46 defined by the base 30, and a cover 66.

Each basket 22A to 22E also comprises a gasket set 68 to force the upstream gaseous flow to pass through the basket 22A to 22E and come into contact with the solid product 24.

Figure 2:
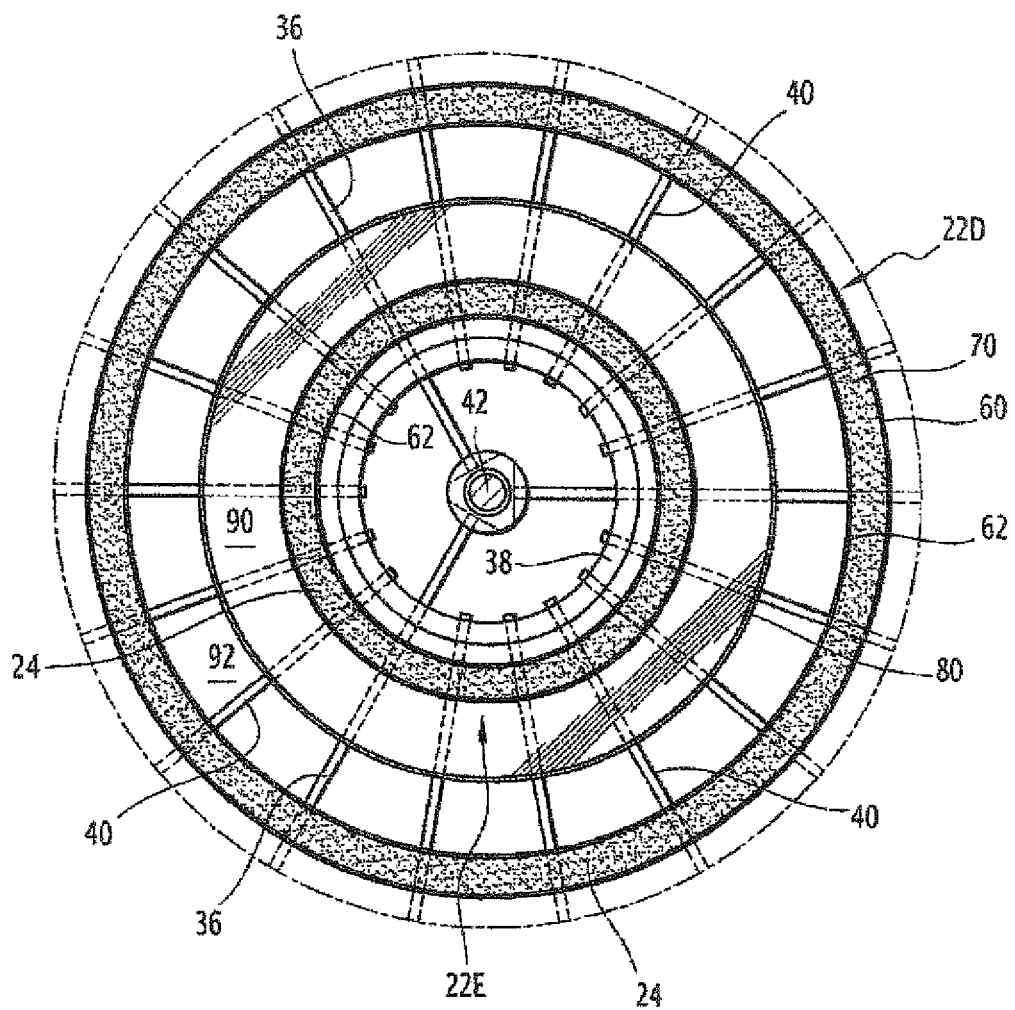
FIG. 2 is a view in part section on II-II of FIG. 1.
Figure 3:
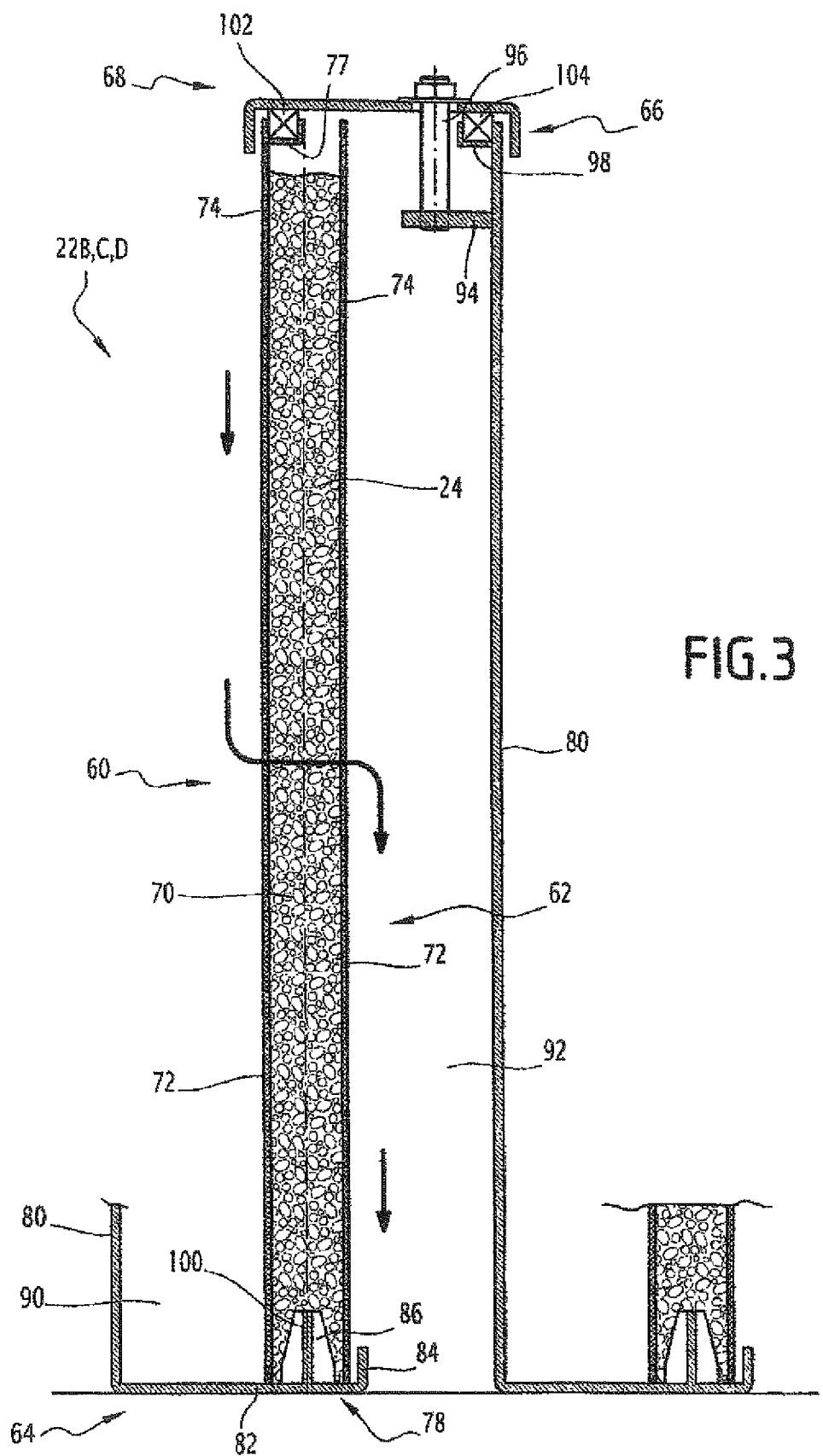
FIG. 3 is a detail illustrating a basket of the device of FIG. 1.

As illustrated by FIGS. 1, 2 and 3, the upstream wall 60 and the downstream wall 62 are of revolution about the axis A-A'. They are advantageously homothetic in relation to one another with respect to the axis A-A'. In particular, the walls 60, 62 are cylindrical of axis A-A' and are concentric.

The upstream wall 60 and the downstream wall 62 between them delimit an intermediate space 70 containing the solid product 24. This space 70 is advantageously annular.

With reference to FIG. 3, the upstream wall 60 comprises a perforated lower region 72 and, advantageously, a solid upper region 74.

The perforated lower region 72 is formed for example by a grating. The grating delimits a plurality of openings for communication between the intermediate space 70 and the outside. The openings have dimensions suited to containing the solid product 24. The maximum transverse dimensions of the openings are, for example, less than 2.5 mm and comprised between 0.5 mm and 15 mm.

The solid upper region 74 has a height lower than that of the perforated region 72, for example less than 30% of the height of the perforated region 72.

The upstream wall 60 has an upper channel 77 to accommodate the gasket set 68, as will be seen later on.

The downstream wall 62 is situated on the inside relative to the upstream wall 60 with respect to the central axis A-A'. The downstream wall 62 also has a perforated lower region 70 analogous to the lower region 72 of the upstream wall 60 and, advantageously, a solid upper region 74, analogous to the upper region 74 of the upstream wall 60.

The intermediate space 70 has a thickness, measured at right angles to the axis A-A', that is less than the height of each wall 60, 62. The intermediate space 70 is more or less filled with solid product 24. The height of solid product 24 in the intermediate space 70 is greater than the height of the perforated region 72.

According to the invention, and as visible in FIG. 4, the upstream wall 60 and the downstream wall 62 are able to move freely relative to one another over a given radial expansion travel, and relative to the support 20 to allow differential expansion of the perforated walls 60, 62.

For that, the upstream wall 60, like the downstream wall 62, are placed, without being fixed, on each base structure 64, thereby being able to slide freely over the base structure 64 over a given radial expansion travel.

Likewise, the cover 66 is placed over, without being fixed to, at least one of the walls 60, 62, allowing free radial movement of each wall 60, 62 with respect to the cover 66 over the given expansion travel.

In this example, the base structure 64 comprises a shoe 78 bearing the perforated walls 60, 62, the shoe 78 being mounted so that it can slide on the sliding surface 46 of the support 20. The base structure 64 also comprises a tubular deflector 80 positioned facing one of the walls 60, 62.

The shoe 78 comprises a baseplate 82. It advantageously comprises an internal rim 84, and at least one projection 86 for the positioning of the walls 60, 62 which is positioned between the internal rim 84 and the deflector 80.

The baseplate 82 is solid. It takes the form of an annulus of revolution about the axis A-A'. It rests on the surface 46 and is able to slide over this surface 46 when the perforated walls 60, 62 move, under the effect of their expansion.

The rim 84 projects along the interior edge of the baseplate 82. It is of a height lower than that of the deflector 80.

Each positioning projection 86 projects from the plate 82, into the intermediate space 70 between the perforated walls 60, 62. It advantageously has a shape that converges toward the top to facilitate guidance of the perforated walls 60, 62 when they are mounted on the base structure 64.

The shoe 78 bears at least one positioning projection 86 and advantageously bears a plurality of positioning projections 86 angularly distributed about the axis A-A'.

The deflector 80 projects upward from the outer edge of the shoe 78. It is formed by a circumferential solid wall extending over the entire height of the perforated wall 60, 62.

In this example, the deflector 80 extends facing and radially separated from the upstream wall 60, over the entire height of the upstream wall 60.

As illustrated by FIG. 3, each deflector 80, with the exception of the deflector of the outermost basket 22A, also extends facing the downstream wall 62 of a basket 22A to 22E situated externally in relation to the basket 22B to 22D.

Each deflector 80 therefore defines, with the upstream wall 60 facing which it is situated, an upstream passage 90 for conveying the upstream flow. The upstream passage 90 opens upward into the upstream part 16 of the chamber 12. It is closed off at the bottom by the shoe 78 and closed off at the side toward the outside by the deflector 80.

The upstream passage 90 is delimited laterally toward the inside by the upstream wall 60. It extends continuously about the axis A-A'.

Each downstream wall 62, when situated facing the deflector 80 of a basket 22A to 22C situated inside the basket 22A to 22E, delimits, with the deflector 80 opposite, a passage 92 for discharging the treated flow.

The discharge passage 92 opens downward into the downstream part 18 of the chamber 12, through the passage openings 36 present in the support 20. The discharge passage 92 is delimited in a fluid-tight manner toward the top by the cover 66. It extends continuously about the axis A-A'.

Each deflector 80 further advantageously comprises a support panel 94 for an assembly 96 for fixing the cover 66 of an adjacent panel, and an auxiliary channel 98 to accept a seal of the gasket set 68.

The cover 66 straddles the perforated walls 60, 62 and advantageously the deflector 80 of an adjacent basket 22A to 22E. It is fixed to the deflector 80 of an adjacent basket 22A to 22E using the fixing assembly 96.

The gasket set 68 comprises a lower baffle 100 projecting into the intermediate space 70 and seals 102, 104 respectively housed in the channels 77, 98.

The baffle 100 is formed of an annular projection positioned in the intermediate space 70. The baffle 100 projects upward from the shoe 78, extending continuously about the axis A-A'.

The baffle 100 is covered with solid product 24. Thus, the baffle 100 forces the upstream flow entering the intermediate space 70 to come into contact with the solid product 24 and prevents it from passing under the solid product 24, given the deflection brought about by the baffle 100.

The seals 102, 104 are housed respectively in the channels 77, 98.

The seal 102 is able to prevent the upstream flow from passing between the cover 66 and the upstream wall 60 while allowing a degree of radial slippage between the upstream wall 60 and the cover 66.

The auxiliary seal 104 is positioned between the cover 66 and the adjacent 80 deflector 80 to prevent the treated flow from passing between the adjacent deflector 80 and the cover 66.

In the example depicted in FIG. 1, the cover 66 of the basket 22D situated furthest toward the inside relative to the axis A-A' is fixed on the central rod 42 rather than on a deflector. The discharge passage 92 is then delimited between the rod 42 and the downstream wall 62 of the basket 22D.

Moreover, the deflector 80A of the basket 22A situated furthest toward the outside relative to the axis A-A' extends at an angle to the axis A-A'. It is formed of a solid frustoconical wall that guides the upstream flow toward the base 30.

The deflector 80A of the basket 22A is fixed to the exterior part 32 via an expansion absorbing member 110. The member 110 is formed of a continuous bellows, for example of J-shaped cross section.

The member 110 is able to absorb the differential expansions between the deflector 80A and the fixed exterior part 32 and between the deflector 80A and the tie bolts 52.

Thus, the various elements that make up the baskets 22A to 22E are able to expand radially and differentially relative to one another and relative to the support 20. Thus, each perforated wall 60, 62 is able to expand differentially relative to the perforated wall 62, 60 facing which it is situated by sliding radially between the base structure 64 and the cover 66. Furthermore, each shoe 78 is able to expand and move by sliding over the sliding surface 46 in order to compensate for any differential expansion there might be.

The exterior deflector 80A is also able to expand freely relative to the exterior part 32 and the tie bolts 52 via the absorption member 110.

This allows the device 14 to contain a solid product 24 in a well-confined manner while at the same time maintaining its structural integrity, notably when the temperature difference between the upstream flow and the downstream flow is very high.

In this example, the baskets 22A to 22E are manufactured based on metal, notably steel. In particular, the perforated walls 60, 62 and the base structures 60 are made of metal.

The assembly of the device 14 will now be described.

Initially, the base structures 64 are placed on the sliding surface 46 of the perforated base 30 without being fixed. Next, the respective perforated walls 60, 62 of each basket 22A to 22E are placed on an associated base structure 64, without being fixed, advantageously by being guided by the projections 86.

The intermediate space 70 between each pair of perforated walls 60, 62 is then open at the top. The solid product 24 is deposited in each intermediate space 70 to fill it to a level extending above the perforated region 72.

Next, the seals 102, 104 are mounted in the respective channels 77, 98. The covers 66 are then placed so that they overlap the perforated walls 60, 62 and an adjacent deflector 80.

The fixing assemblies 96 are then fitted. However, a radial expansion travel exists between each perforated wall 60, 62 and the base structure 64 on which it is placed, and between each perforated wall 60, 62 and the cover 66.

Likewise, the base structures 64 are just placed on the sliding surface 46 with the ability to slide over this surface 46.

Once the covers 66 have been fitted, the device 14 delimits a plurality of passages 90 for conveying the upstream flow which passages open upstream into the upstream part 16. They also delimit a plurality of passages 92 for the discharge of treated flow which passages open downstream into the downstream part 18 through the passage openings 36 formed in the base 30.

Between each pair of perforated walls 60, 62, the device 14 delimits the intermediate space 70 that houses the solid product 24 in a well-confined manner.

The way in which the device 14 works will now be described.

Initially, an upstream flow is generated upstream of the device 14, in the upstream part 16. This upstream flow is at a high temperature and at a low-to-high pressure. The temperature of the upstream flow is, for example, higher than 750° C. and its pressure is, for example, higher than 1 bar.

As can be seen in FIG. 4, the upstream flow therefore flows through the upstream passages 90. Because the upstream passages 90 are closed off at the bottom by the shoes 78 and toward the outside by the deflector 80, the upstream flow flows radially toward the intermediate space 70 through the upstream perforated wall 60.

The upstream flow therefore enters the intermediate space 70. It comes into contact with the solid product 24 to undergo a treatment aimed for example at oxidizing a component or at abating a gas that is to be eliminated.

It then forms a treated downstream flow which passes through the downstream wall 62, and is then guided into the discharge passage 92 before re-emerging from the base 30 in the downstream part 18 via the passage openings 36.

When the device 14 is being used and notably when the plant 10 is being started up, the temperature difference between the upstream flow present in the upstream passage 90 and the downstream flow present in the downstream passage 92 may be significant, notably higher than 100° C., for example higher than 200° C.

This appreciable temperature difference causes differential expansion between the upstream wall 60 and the downstream wall 62 of each basket 22A to 22E, which expansion is indicated schematically by arrows of variable length in FIG. 4.

Thus, the upstream wall 60 is subjected to a temperature that is higher than that of the downstream wall 62. The outward radial expansion of the upstream wall 60 is therefore greater than that of the downstream wall 62. The intermediate space 70 therefore increases freely.

The upstream wall 60 therefore moves radially outward by sliding between the base structure 64 and the cover 66 over a radial travel that is greater than the radial travel of the downstream wall 62.

However, because there is an excess of product 24 present in the part situated facing the solid zone 74, the level of solid product 24 drops again, while still remaining always above the perforated region 72. The upstream flow therefore always comes into contact with solid product 24 before passing further through the downstream wall 62.

In addition, the differential expansion of the perforated walls 60, 62 takes place by simple sliding on the shoe 68 and under the cover 66. No mechanical stress therefore appears between the wall 60 and the wall 62.

In addition, the differential expansions that may occur between the base structures 64 which have a small thickness and the perforated base 30 which has a thickness significantly greater than that of the base structures 64 are compensated for by the sliding of the base structures 64 on the sliding surface 46.

The only fixed point of the baskets 22A to 22E, situated at the exterior deflector 80A, is also compensated for in expansion by the presence of the absorption member 110.

The device 14 is able to tolerate the large temperature differences to which it is subjected, notably on plant startup and shutdown, or when process parameters are altered.

As a result, the device 14 is highly reliable in treating the flow flowing through the plant 10, notably when there is a large temperature difference between the upstream flow entering the device 14 and the treated downstream flow leaving the device 14.

The device 14 is therefore particularly effective at carrying out a treatment, such as an oxidation, as an abatement of gas that is to be eliminated from the upstream flow. The invention that has just been described is also simple to implement and limits the cost of the process.

Moreover, because the upstream flow is directed into the baskets 22A to 22E from the outside inward, the differential expansion between the upstream wall 60 and the downstream wall 62 causes the intermediate space 70 between these walls 60, 62 to expand, thus limiting the risk of mechanical damage.

The presence of a plurality of concentric baskets 22A to 22E reduces the pressure drops by reducing the thickness of solid product 24 present in each basket 22A to 22E, while at the same time maintaining an equivalent treatment capacity.

More generally, the device 14 according to the invention is able to treat any upstream flow, such as the flow resulting from the conversion of ammonia.

The invention claimed is:

1. A device (14) for treating an upstream flow over a solid product (24), comprising:
   a support (20);
   at least one basket (22A to 22E) supported by the support (20), the basket (22A to 22E) comprising an upstream perforated wall (60) and a downstream perforated wall (62) which between them delimit an intermediate space (70) for housing the solid product (24), the upstream perforated wall (60) delimiting, on the opposite side to the intermediate space (70), an upstream flow conveying passage (90), the downstream perforated wall (62) delimiting, on the opposite side to the intermediate space (70), a passage (92) for discharging a treated flow;
   wherein the upstream perforated wall (60) and the downstream perforated wall (62) are each mounted freely movable relative to one another and relative to the support (20), over a given expansion travel.

2. The device (14) as claimed in claim 1, wherein the upstream perforated wall (60) and the downstream perforated wall (62) are of revolution about a central axis (A-A'), and the upstream perforated wall (60) and the downstream perforated wall (62) are each mounted free to move radially relative to the central axis (A-A') over the given expansion travel.

3. The device (14) as claimed in claim 2, wherein the passage (90) for conveying the upstream flow is situated radially on the outside relative to the passage (92) for discharging the treated flow with respect to the central axis (A-A').

4. The device (14) as claimed in claim 1, wherein each basket (22A to 22E) comprises a base structure (64), the upstream perforated wall (60) and the downstream perforated wall (62) are disposed on and slidably mounted on the base structure (64), and the base structure (64) is slidably mounted on the support (20).

5. The device (14) as claimed in claim 4, wherein the base structure (64) comprises a deflector (80) that is selectively positionable facing the upstream perforated wall (60) to delimit the conveying passage (90) and/or facing a downstream perforated wall (62) to delimit the discharge passage (92).

6. The device (14) as claimed in claim 5, wherein at least one base structure (64) delimits an exterior deflector (80A), and the exterior deflector (80A) is connected to the support (20) via an expansion absorbing member (110).

7. The device (14) as claimed in claim 1, wherein the device comprises a baffle (100) that is insertable in a lower part of the intermediate space (70) to be covered with solid product (24).

8. The device (14) as claimed in claim 1, wherein the basket (22A to 22E) comprises a cover (66) positioned over the upstream perforated wall (60) and the downstream perforated wall (62), and a seal (102) is inserted between the cover (66) and the upstream perforated wall (60).

9. The device (14) as claimed in claim 1, wherein the upstream perforated wall (60) comprises a solid upper region (74), and a perforated lower region (72), and the solid upper region (74) and the perforated lower region (72) are each positionable facing the conveying passage (90).

10. The device (14) as claimed in claim 1, wherein it comprises a plurality of baskets (22A to 22E), each basket (22A to 22E) comprising an upstream perforated wall (60) and a downstream perforated wall (62) which are mounted with the freedom to move over a given expansion travel, and the baskets (22A to 22E) are positioned one inside the other.

11. The device (14) as claimed in claim 1, wherein the support (20) has a plurality of openings (36) through which flow can pass.

12. The device (14) as claimed in claim 1, wherein the support (20) comprises an exterior fixed part (32) and a base (30) supporting the or each basket (22A to 22E), and the base (30) is free to move over an expansion travel relative to the exterior fixed part (32).

13. A method for treating an upstream flow over a solid product (24), the method comprising the following steps:
    providing a device (14) as claimed in claim 1, the or each basket (22A to 22E) comprising a solid treatment product (24) in its intermediate space (70);
    conveying an upstream flow in the conveying passage (92);
    passing the upstream flow through the upstream perforated wall (60) and bringing the upstream flow into contact with the solid product (24) to generate a treated downstream flow; and
    removing the downstream flow through the downstream perforated wall (62) and through the discharge passage (92);
    wherein the upstream perforated wall (60) and the downstream perforated wall (62) are each able to move freely relative to one another and relative to the support (20) over a given expansion travel when the steps are being carried out.

14. The method as claimed in claim 13, wherein the temperature difference between the upstream flow and the downstream flow is greater than 100° C.

15. The method as claimed in claim 13, wherein the upstream flow is a gaseous flow and the solid treatment product is a catalyst.

16. The device as claimed in claim 6, wherein the expansion absorbing member (110) is an expansion bellows.

17. The device as claimed in claim 12, wherein the base (30) is free to move over an expansion travel relative to the exterior fixed part (32) by being articulated via a number of tie bolts (52).

18. The method as claimed in claim 14, wherein the temperature difference between the upstream flow and the downstream flow is greater than 250° C.

19. The method as claimed in claim 15, wherein the upstream gaseous flow comprises an oxide of nitrogen and the solid treatment product comprises an oxidation catalyst or a catalyst for the abatement of a gas that is to be eliminated.

20. A device (14) for treating an upstream flow over a solid product (24), comprising:
    a support (20),
    at least one basket (22A to 22E) supported by the support (20) and comprising a base structure (64), an upstream perforated wall (60) slidably mounted on the base structure (64), and a downstream perforated wall (62) slidably mounted on the base structure (64), wherein:
    the upstream perforated wall (60) and the downstream perforated wall (62) are each rotationally symmetrical about a central axis (A-A'), are each mounted freely movable over a given expansion travel radially relative to the central axis (A-A') and freely movable over a given expansion travel relative to one another and to support (20), and between them delimit an intermediate space (70) for housing the solid product (24),
    the upstream perforated wall (60) delimits, on the opposite side to the intermediate space (70), an upstream flow conveying passage (90),
    the downstream perforated wall (62) delimits, on the opposite side to the intermediate space (70), a passage (92) for discharging a treated flow, and
    the passage (90) for conveying the upstream flow is situated radially on the outside relative to the passage (92) for discharging the treated flow with respect to the central axis (A-A').

* * * * *